United States Patent [19]

Kaspar et al.

[11] 4,402,702
[45] Sep. 6, 1983

[54] LOW-DUST DYESTUFF FORMULATIONS

[75] Inventors: Vaclay Kaspar, Cologne; Klaus Walz; Hans-Heinz Mölls, both of Leverkusen; Reinhold Hörnle; Rainer Skerhut, both of Cologne, all of Fed. Rep. of Germany

[73] Assignee: Bayer Aktiengesellschaft, Leverkusen, Fed. Rep. of Germany

[21] Appl. No.: 331,334

[22] Filed: Dec. 16, 1981

[30] Foreign Application Priority Data

Jan. 8, 1981 [DE] Fed. Rep. of Germany ....... 3100353

[51] Int. Cl.³ ...................... C09B 67/24; C09B 67/06; C09B 67/32; C09B 67/38
[52] U.S. Cl. .......................................... 8/524; 8/526; 8/586; 8/602
[58] Field of Search ............................ 8/524, 526, 586

[56] References Cited

U.S. PATENT DOCUMENTS 3,507,605 4/1970 Hindle ..................................... 8/586
3,616,473 11/1971 Leach ..................................... 8/586
4,069,013 1/1978 Hett et al. .............................. 8/524

FOREIGN PATENT DOCUMENTS 1365782 9/1974 United Kingdom .
1507412 4/1978 United Kingdom .
1596988 9/1981 United Kingdom .

Primary Examiner—Maria Parrish Tungol

Attorney, Agent, or Firm—Sprung, Horn, Kramer & Woods

[57] ABSTRACT

Solid formulations of organic dyestuffs, or of optical brighteners, characterized in that they contain a mixture of (a) 70–90% by weight of a mineral oil,
(b) 0.5–10% by weight of an amide of the formula

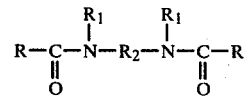

in which
R represents $C_{10}$–$C_{22}$-alkyl or -alkenyl,
$R_1$ represents H or $C_1$–$C_4$-alkyl, or the two $R_1$'s together represent a 1,2-ethylene bridge and
$R_2$ represents

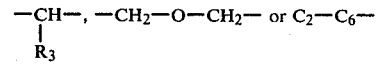

alkylene, and
$R_3$ represents H, $C_1$–$C_6$-alkyl or phenyl,
(c) 0.5–15% by weight of a non-ionic surface-active agent and
(d) 0–8% by weight of a cationic or anionic surface-active agent, and processes for the production of low-dust and low-foam solid dyestuff formulations.

9 Claims, No Drawings

LOW-DUST DYESTUFF FORMULATIONS

The invention relates to solid formulations of dyestuffs and optical brighteners, which contain a mixture of (a) 70–90% by weight of a mineral oil,
(b) 0.5–10% by weight of an amide of the formula

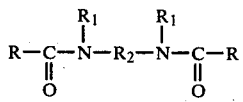

in which

R represents $C_{10}$–$C_{22}$-alkyl or -alkenyl,
$R_1$ represents H or $C_1$–$C_4$-alkyl, or the two $R_1$'s together represent a 1,2-ethylene bridge and
$R_2$ represents

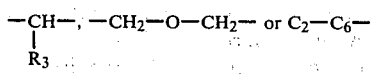

alkylene, and
$R_3$ represents H, $C_1$–$C_6$-alkyl or phenyl, (c) 0.5–15% by weight of a non-ionic surface-active agent and
(d) 0–8% by weight of a cationic or anionic surface-active agent.

The formulations preferably contain 0.2–15% by weight of this mixture.

Possible mineral oils are in particular normally liquid aliphatic, alicyclic and/or aromatic hydrocarbons whose boiling point is in particular above 150° C. Aliphatic hydrocarbons, which can contain different amounts of cycloaliphatic and/or aromatic hydrocarbons, are preferably used. As examples of the aliphatic hydrocarbons for this purpose, dodecane, tetradecane, hexadecane, octadecane, eicosane or their mixtures, synthetic hydrocarbons, such as, for example, are obtained by the Fischer-Tropsch synthesis, or industrial mineral oils which are made from variously refined crude oils and are commercially available as, for example, paraffin oils, spindle oils or white oils may be mentioned.

Examples of the amides of the formula (I) which may be mentioned are: methylene-bis-lauric acid amide, methylene-bis-myristic acid amide, methyl-bis-palmitic acid amide, methylene-bis-stearic acid amide, methylene-bis-eicosanoic acid amide, methylene-bis-behenic acid amide, methylene-bis-oleic acid amide, 1,2-ethylene-bis-lauric acid amide, 1,2-ethylene-bis-palmitic acid amide, 1,2-ethylene-bis-stearic acid amide, 1,4-butylene-bis-stearic acid amide, isobutylene-bis-stearic acid amide, benzylidene-bis-stearic acid amide, methylene-bis-linoleic acid amide, bis-palmitoylaminomethyl ether, bis-stearoylaminomethyl ether, 1,3-bis-lauroylimidazolidine or 1,3-bis-stearylimidazolidine.

Preferred compositions contain methylene-bis-stearic acid amide, methylene-bis-eicosanoic acid amide or methylene-bis-behenic acid amide, but in particular methylene-bis-stearic acid amide. The compounds are largely known and can be prepared by known methods, as described, for example in British Pat. No. 1,410,722 or in U.S. Pat. No. 2,554,846.

Suitable non-ionic surface-active agents are the reaction products of fatty acids, fatty acid amides, fatty alcohols or fatty amines or $C_6$–$C_{12}$-alkylphenols, which contain 8 to 20 carbon atoms and which may be unsaturated, with ethylene oxide and/or propylene oxide, as well as derivatives of such reaction products, such as, for example, are obtained by esterifying the terminal hydroxyl groups with carboxylic acids, such as acetic acid, lauric acid or benzoic acid, or by etherifying them with, for example, isobutylene or alkyl chlorides. Further suitable non-ionic surface-active agents are also the surface-active derivatives of polyhydric alcohols, for example fatty acid esters of acids having 10–22 carbon atoms and pentitols, hexitols, pentoses, hexoses or polysaccharides as well as their oxyethylation products. Preferred non-ionic surface-active agents are reaction products of fatty acids or fatty acid amides containing 12–18 carbon atoms with 3–10 mols of ethylene oxide, or of fatty alcohols containing 8–18 carbon atoms, or of $C_6$–$C_9$-alkylphenols, with 3–10 mols of ethylene oxide, or esters of such compounds with fatty acids containing 12–18 carbon atoms.

The compositions contain, as further surface-active agents, 0–8%, preferably 0.5–3%, of a cation-active or anion-active compound. Examples of cation-active compounds which may be mentioned are: salts of amines which, in addition to not less than one basic nitrogen atom, contain not less than one alkyl radical or alkenyl radical having 10–20 carbon atoms, quaternary ammonium compounds derived therefrom, heterocyclic compounds, such as alkylpyridinium salts, imidazolinium compounds, as well as amine oxides or sulphonium compounds. The compositions preferably contain, as cationic surface-active agents, those of the formula

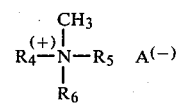

in which $R_4$ represents a $C_{12}$–$C_{20}$-alkyl radical or a $C_{12}$–$C_{20}$-alkenyl radical,
$R_5$ represents the hydroxyethyl group or the hydroxypropyl group,
$R_6$ represents $R_5$ or methyl and $A^{(-)}$ represents an anion, in particular $Cl^{(-)}$,
$Br^{(-)}$ or $CH_3SO_4^{(-)}$.

Suitable anionic surface-active agents are, for example, alkanesulphonates, alkylbenzenesulphonates, alkylnaphthalenefulphonates, alkyl-sulphates or lignin-sulphates containing 12–22 carbon atoms, and also salts of fatty acids.

Possible suitable dyestuffs are, for example, the following dyestuffs: anionic dyestuffs, cationic dyestuffs, disperse dyestuffs, vat dyestuffs, metal complex dyestuffs, such as 1:1- and 1:2-copper dyestuffs, chromium dyestuffs or cobalt dyestuffs, reactive dyestuffs, chrome dyestuffs, inorganic and organic pigments or direct dyestuffs as well as optical brighteners.

Preferred solid formulations contain 0.4–5% of a composition from (a) 80–90% of a mineral oil having a boiling point of not less than 270° C.,
(b) 2–6% of an amide of the formula (I), in particular methylene-bis-stearic acid amide,
(c) 4–10% of a non-ionic surface-active agent, in particular a reaction product of an aliphatic alcohol, alkylphenol, fatty acid amide or a fatty acid containing 8–18 carbon atoms with 3–10 mols of ethylene oxide, and (d) 0–3% of a cationic surface-active agent, in particular a compound of the formula

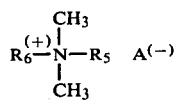

in which

R$_5$ and A$^{(-)}$ have the abovementioned meaning and R$_6$ represents a C$_{16}$–C$_{20}$-alkyl radical or a C$_{16}$–C$_{20}$-alkenyl radical.

The solid formulations according to the invention can contain, as further additives, customary formulation additives, such as dextrin, sugars, inorganic salts, such as sodium sulphate, sodium chloride or trisodium phosphate, as well as dispersing agents, wetting agents or emulsifiers.

The solid formulations according to the invention are obtained, by methods which are in themselves known, by adding a mixture of the components (a)–(d) to the dyestuffs or optical brighteners.

The addition can be effected by various methods, for example by mixing the already dried and formulated product with the abovementioned composition in a mixer or, more advantageously, by simultaneously spray-drying the dyestuff solution or dispersion together with the abovementioned composition, which, in the form of an aqueous emulsion, can be metered in continuously or discontinuously.

The solid formulations according to the invention, so obtained, are distinguished from hitherto customary formulations, as described, for example, in German Offenlegungsschrift No. 2,656,407, not only by improved dusting behaviour during handling but also by the relatively smaller foaming-tendency of the dyestuffs or optical brighteners during application from aqueous liquors.

The determination of the dusting behaviour is carried out in a dust measuring instrument from Messrs. Cassella.

The measure of the dust value which is used is the attenuation of a light beam passing through a receptacle, which attenuation is caused by the whirling-up of dyestuff dust in this container and which is measured with the aid of a photocell. The dust is created by dyestuff falling through an apparatus-defined height. The light attenuation is measured immediately after the impact of the dyestuff on the bottom of the container and 30 seconds later. The two values are added together. The dust value measurement is carried out with a sample weight of 30 g. The height of fall is 750 mm. The desired values for a well dedusted dyestuff are usually for (a) coloured dyestuffs ≦10 and
(b) black dyestuffs ≦5.

(0 denotes zero attenuation; 100 denotes complete attenuation).

The determination of the foaming behaviour is carried out according to the method of Schlachter Direkes in the foam-beating instrument from Messrs. E. Haage, Mülhein/Ruhr. The measurement of the foam is carried out on 200 ml of a solution which contains 0.4 g/l of the substance under investigation. The measurement is taken after 100 beats in a minute. The value is read at once, after 1 minute and after 5 minutes (in cm$^3$).

EXAMPLE 1

Before spray-drying, 2 parts by weight, expressed as solids, of a composition described below, are continuously metered, as an aqueous emulsion, into an approximately 30% strength dispersion of the 1:2 chromium complex of the dyestuff of the formula

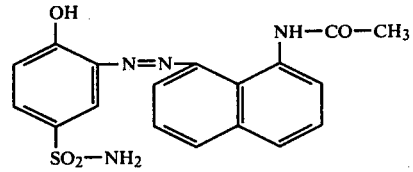

formulated with customary extenders.

Spray-drying is carried out in a spray drier with an inlet temperature of 180° C. and an outlet temperature of 80° C. A one-material nozzle is used as atomiser. Low-dust and low-foam dyestuff granules having good cold solubility and hot solubility are obtained. The composition used was prepared in the following manner:

11.2 parts of stearyl-dimethyl-hydroxyethylammonium chloride and 42 parts of a reaction product of a C$_{12}$–C$_{14}$ fatty alcohol with 3 mols of ethylene oxide are dissolved at 70°–80° C. in 405 parts of a mineral oil (density at 15° C.: 0.900; viscosity at 20° C.: 13.2 cSt: boiling point range 282°–332° C.). The solution obtained is cooled down to 20°–30° C. and, at this temperature and with efficient stirring, a solution at 120° C. of 21 parts of methylene-bis-stearic acid amide in 400 parts of mineral oil is added gradually. Approximately 890 parts of an oily liquid are obtained, from which a stable emulsion can be prepared by simply pouring into water and stirring. Density: 0.9 kg/m$^3$; Ford cup flow time (4 mm nozzle): 18 seconds.

EXAMPLE 2

Shortly before spray-drying, 0.5 part by weight of a composition described below is added, as an aqueous emulsion, to an approximately 25% strength dispersion of the disperse dyestuff of the formula

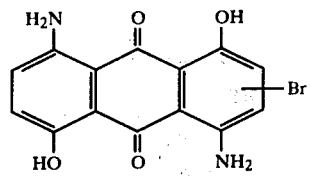

finished with the customary dispersing agents. Spray-drying is then carried out in a spray-drier with an inlet temperature of 170° C. and an outlet temperature of 75° C. Low-dust and low-foam dyestuff granules, which can be readily dispersed in water, are obtained. The composition used was prepared in the following manner:

42 parts of methylene-bis-stearic acid amide were dissolved at 120° C. in 400 parts of a Fischer-Tropsch hydrocarbon having an average carbon number of 15. This solution was allowed to run, gradually and with efficient stirring, into a solution, cooled down to 20°–30° C., which had been prepared by mixing 42 parts of a reaction product of industrial-grade lauryl alcohol with 3 mols of ethylene oxide, with 11.2 parts of octadecyl-dimethylhydroxyethyl-ammonium chloride and 400 parts of the same hydrocarbon. Approximately 890 parts of a white oil were obtained. Density: 0.85 kg/m³; Ford cup flow time (4 mm nozzle): 18 seconds. The product can be diluted with water to give a stable emulsion.

EXAMPLE 3

Shortly before spray-drying, 3.3 parts by weight of a composition described below, relative to dry matter, are added, as an aqueous emulsion, to an approximately 30% strength solution of the 1:2 chromium complex of the dyestuff of the formula

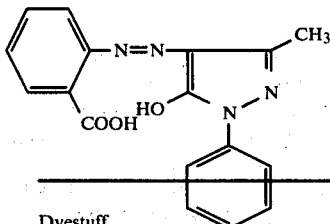

formulated with the customary formulation additives. Spray-drying is then carried out in a spray-drier with an inlet temperature of 200° C. and an outlet temperature of 95° C. A one-material nozzle is used as atomiser. Low-dust and low-foam dyestuff granules having good solubility in water are obtained. The composition used was prepared in the following manner:

16 parts of a sodium alkanesulphonate (average chain length: $C_{21}$) and 63 parts of a reaction product of a $C_{12}$-$C_{14}$ fatty alcohol with 3 mols of ethylene oxide are dissolved at 70°-80° C. in 402 parts of the mineral oil used in Example 1. The solution obtained is cooled down to 20°-30° C. and, at this temperature and with efficient stirring, a solution at 120° C. of 20.5 parts of methylene-bis-stearic acid amide in 402 parts of mineral oil is gradually added. Approximately 900 parts of an oily liquid are obtained, which can be emulsified by simply pouring into water and stirring. Density: 0.9 kg/m³;

Ford cup flow time (4 mm nozzle): 47 seconds.

EXAMPLE 4

Some more dyestuff formulations, formulated according to the invention, are contrasted below with the corresponding formulations which make use of commercially available dedusting agents:

| Dyestuff | Dust value | Foam value [cm²] immediately | after 1' | after 5' |
| --- | --- | --- | --- | --- |
| 1. Dyestuff of Example 3 | 21 + 3 | 500 | 300 | 0 |
| + 2 parts by weight of the product used in Example 1 | 1 + 0 | 150 | 0 | 0 |
| + 2 parts by weight of a commercially available dedusting agent | 15 + 3 | 1,150 | 950 | 750 |
| 2. CI Disperse Blue 81 (= No. 64,515) | 77 + 48 | 400 | 0 | 0 |
| + 2 parts by weight of the product used in Example 1 | 6 + 2 | 0 | 0 | 0 |
| + 2 parts by weight of a commercially available dedusting agent | 40 + 14 | 450 | 350 | 250 |
| 3. CI Acid Red 42 (= No. 17,070) | 10 + 1 | 750 | 700 | 350 |
| + 2 parts by weight of the product used in Example 1 | 3 + 0 | 250 | 0 | 0 |
| + 2 parts by weight of a commercially available dedusting agent | 5 + 1 | 300 | 250 | 100 |
| 4. Dyestuff of the formula | 13 + 1 | 850 | 800 | 600 |

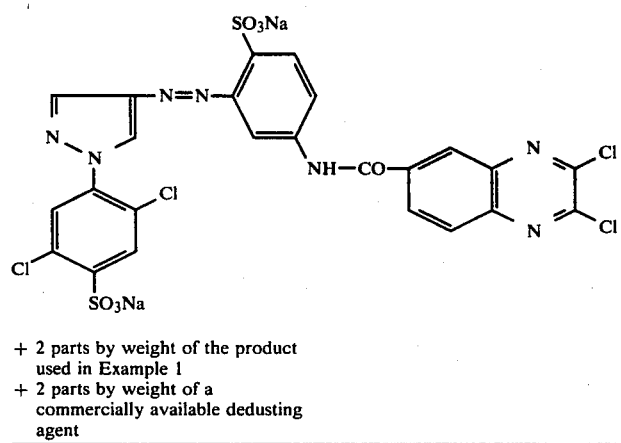

| | | | | |
| --- | --- | --- | --- | --- |
| + 2 parts by weight of the product used in Example 1 | 1 + 0 | 250 | 125 | 0 |
| + 2 parts by weight of a commercially available dedusting agent | 6 + 0 | 450 | 350 | 300 |

We claim:
1. A solid composition comprising (A) an organic dyestuff and (B) an anti-dusting agent, the antidusting agent comprising about 0.2 to 15% by weight and comprising a mixture of
 (a) 70-90% by weight of a mineral oil.
 (b) 0.5-10% by weight of an amide of the formula

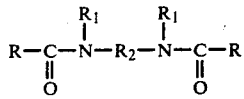

in which
R represents $C_{10}$–$C_{22}$-alkyl or -alkenyl,
$R_1$ represents H or $C_1$–$C_4$-alkyl, or the two $R_1$'s together represent a 1,2-ethylene bridge and
$R_2$ represents

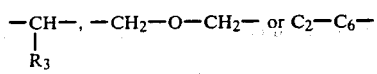

alkylene, and
$R_3$ represents H, $C_1$–$C_6$-alkyl or phenyl,
(c) 0.5–15% by weight of a non-ionic surface-active agent and
(d) 0–8% by weight of a cationic or anionic surface-active agent.

2. A composition according to claim 1, in which (B) is present in 0.4 to 5% by weight and comprises a mixture of
(a) 80–90% of a mineral oil having a boiling point of not less than 270° C.,
(b) 2–6% of an amide as in claim 1,
(c) 4–10% of a non-ionic surface-active agent which is a reaction product of an aliphatic alcohol, alkylphenol, fatty acid amide or a fatty acid having 8–18 carbon atoms with 3–10 mols of ethylene oxide, and
(d) 0–3% of a cationic surface-active agent of the formula

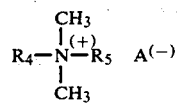

in which
$R_4$ represents a $C_{12}$–$C_{20}$-alkyl radical or a $C_{12}$–$C_{20}$-alkenyl radical,
$R_5$ represents the hydroxyethyl group or hydroxypropyl group and
$A^{(-)}$ represents an anion, in particular Cl, Br or $CH_3SO_4$.

3. A composition according to claim 1, wherein (b) is a methylene-bis-stearic acid amide.

4. A process for the preparation of a low-dust and low-foam solid dyestuff formulation according to claim 1, comprising simultaneously spray drying a mixture of a solution or dispersion of a dyestuff (A) and the agent (B).

5. A process according to claim 4, wherein (B) is continuously metered into the solution or dispersion of (A) before spraying-drying.

6. A process according to claim 4, wherein the mixture (B) is added in the form of an aqueous emulsion.

7. A process according to claim 4, wherein the mixture (B) is present in 0.5 to 3% by weight.

8. A process according to claim 4, wherein a one-material nozzle is used as atomizer.

9. A process for the preparation of a low-dust and low-foam solid dyestuff formulation according to claim 1, comprising adding (B) to the previously dried dyestuff (A).

* * * * *